US011836751B2

(12) United States Patent
Yu et al.

(10) Patent No.: US 11,836,751 B2
(45) Date of Patent: Dec. 5, 2023

(54) MEASURING RELATEDNESS BETWEEN PREDICTION TASKS IN ARTIFICIAL INTELLIGENCE AND CONTINUAL LEARNING SYSTEMS

(71) Applicant: NEC Laboratories Europe GmbH, Heidelberg (DE)

(72) Inventors: Shujian Yu, Heidelberg (DE); Ammar Shaker, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 741 days.

(21) Appl. No.: 16/807,202

(22) Filed: Mar. 3, 2020

(65) Prior Publication Data

US 2021/0182600 A1 Jun. 17, 2021

Related U.S. Application Data

(60) Provisional application No. 62/948,350, filed on Dec. 16, 2019.

(51) Int. Cl.
G06N 20/00 (2019.01)
G06Q 30/0201 (2023.01)
G06F 17/18 (2006.01)
G06N 3/08 (2023.01)
G06F 17/16 (2006.01)

(52) U.S. Cl.
CPC ......... G06Q 30/0206 (2013.01); G06F 17/16 (2013.01); G06F 17/18 (2013.01); G06N 3/08 (2013.01); G06N 20/00 (2019.01)

(58) Field of Classification Search
None
See application file for complete search history.

(56) References Cited

U.S. PATENT DOCUMENTS

| 10,839,318 B2* | 11/2020 | Shao ............... G06N 5/04 |
| 2003/0093451 A1* | 5/2003 | Chuang ............ G06N 10/00 708/520 |
| 2014/0164313 A1* | 6/2014 | Alboszta ............ G06N 7/01 706/52 |
| 2016/0019218 A1* | 1/2016 | Zhang ............. G06Q 40/04 707/727 |
| 2019/0026655 A1 | 1/2019 | Xie et al. |
| 2020/0027539 A1* | 1/2020 | Xie ............... G06F 18/211 |

FOREIGN PATENT DOCUMENTS

CN 107341497 A * 11/2017 ........... G06K 9/6277

OTHER PUBLICATIONS

Geometry preserving multi-task metric learning Peipei Yang • Kaizhu Huang • Cheng-Lin Liu Mach Learn (2013) 92:133-175 DOI 10.1007/s10994-013-5379-y (Year: 2013).*

(Continued)

*Primary Examiner* — Xuyang Xia
(74) *Attorney, Agent, or Firm* — Leydig, Voit & Mayer, Ltd.

(57) ABSTRACT

A method for measuring relatedness between prediction tasks includes receiving data for a first prediction task. The method further includes measuring the relatedness of the first prediction task to at least one previous prediction task as a difference between divergence of conditional probabilities of the tasks. The method can be advantageously applied in artificial intelligence or continual learning systems.

15 Claims, 10 Drawing Sheets

(56) References Cited

OTHER PUBLICATIONS

He, Xiao et al. "Efficient and Scalable Multi-task Regression on Massive Number of Tasks," AAAI, arXiv:1811.05695v1, Nov. 14, 2018.
Zhang, Yu and Yeung, Dit-Yan, "A Convex Formulation for Learning Task Relationships in Multi-Task Learning," Jul. 2010.
Ren, Yong et al. "Conditional Generative Moment-Matching Networks," NIPS, Barcelona, Spain, Dec. 2016.
Kirkpatrick, James et al. "Overcoming catastophic forgetting in neural networks," arXiv:1612.00796v2, Jan. 25, 2017.
Yu, Shujian et al. "Multivariate extension of matrix-based Renyi's α-order entropy functional," IEEE Transactions on Pattern Analysis and Machine Intelligence, arXiv:1808.07912v3, Jul. 31, 2019.
Gama, Joao et al "A Survey on Concept Drift Adaptation," ACM Comput. Surv. 46, 4, Article 44 (Mar. 2014), 37 pages.
Nielsen, Michael A. and Chuang, Isaac L. "Quantum Computation and Quantum Information," 10th Anniversary Edition, Cambridge University Press, Jan. 2011.
Yang, Peipei et al. "Geometry preserving multi-task metric learning," Mach Learn, 92:133-175, May 25, 2013.
Qahtan, Abdulhakim et al. "A New Study of Two Divergence Metrics for Change Detection in Data Streams," ECAI 2014, IOS Press, Frontiers in Artificial Intelligence and Applications, Jan. 2014.
Cavallanti, Giovanni et al. "Linear Algorithms for Online Multitask Classification," Journal of Machine Learning Research 11, 2901-2934, Oct. 2010.
Saha, Avishek et al. "Online Learning of Multiple Tasks and Their Relationships," Proceedings of the 14th International Conference on Artificial Intelligence and Statistics (AISTATS), Ft. Lauderdale, FL, USA, vol. 15 of JMLR: W&CP 15, Apr. 2011.
Chidlovskii, Boris, "Multi-task learning of time series and its application to the travel demand," arXiv:1712.08164v1, Dec. 21, 2017.
Krishnakumari, Panchamy et al. "Final Development of Demand and Supply Predictors;" Deliverable 4.4; SETA: An open, sustainable, ubiquitous data and service ecosystem for efficient, effective, safe, resilient mobility in metropolitan areas; Oct. 31, 2018.
Ben-David, Shai and Schuller, Reba, "Exploiting Task Relatedness for Multiple Task Learning," In: Schölkopf B., Warmuth M.K. (eds) Learning Theory and Kernel Machines. Lecture Notes in Computer Science, vol. 2777., Aug. 2003.
Zhao. Han et al. "Efficient Multitask Feature and Relationship Learning," arXiv:1702.004423v3, Jul. 10, 2019.
Silver, Daniel L. and Mercer, Robert E., "The Parallel Transfer of Task Knowledge Using Dynamic Learning rates Based on a Measure of Relatedness," Connection Science, May 1996.
Hirnschall, Christoph et al. "Coordinated Online Learning With Applications to Learning User Preferences," arXiv:1702.02849v1, Feb. 9, 2017.
Zhang, Yi and Schneider, Jeff, "Learning Multiple Tasks with a Sparse Matrix-Normal Penalty," Nov. 2010.
Pujara, Jay, "Probabilistic Models for Scalable Knowledge Graph Construction," PhD Dissertation, Univeriity of Maryland, Dec. 2016.

\* cited by examiner

Algorithm 1 Feature Selection with Conditional von Neumann divergence

Input: Feature set $S$; Class labels $y$; Number of features to be selected (denote $k$).

Output: Selected feature set $S^*$; Remaining feature set $\bar{S}$.

1: $S^* = \{\}; \bar{S} = S.$
2: for $i = 1$ to $k$ do
3:    for $X_c \in \bar{S}$ do
4:       Generate "useless" feature set (denote $\{S^\pi, X_c^\pi\}$).
5:       Evaluate the relatedness between $T_i$ and $T_j$ with Eq. (1), where $T_i$ is characterized by input $\{S^\pi, X_c^\pi\}$ and output $y$, $T_j$ is characterized by input $\{S^*, X_c\}$ and output $y$.
6:    end for
7:    Select the candidate feature $X_c^* \in \bar{S}$ with the smallest relatedness between $T_i$ and $T_j$ (i.e., largest value of $R(T_i, T_j)$).
8: end for
9: $S^* \leftarrow X_c^*; \bar{S} = \bar{S}/X_c^*.$
10: return $S^*$; $\bar{S}$.

FIG. 4A

Input: Data from Task 1 ($T_1$): $X_1 \in R^{N_1 \times p}, Y_1 \in R^{N_1}$;
Data from Task 2 ($T_2$): $X_2 \in R^{N_2 \times p}, Y_2 \in R^{N_2}$.
$N_1$ and $N_2$ are the number of samples in $T_1$ and $T_2$, respectively.

Output: Task-relatedness measure $R(T_1 \| T_2)$.

Evaluate sample covariance matrix $C_{X_1 Y_1} \in R^{(p+1) \times (p+1)}$ in $T_1$;

Evaluate sample covariance matrix $C_{X_1} \in R^{p \times p}$ in $T_1$;

Evaluate sample covariance matrix $C_{X_2 Y_2} \in R^{(p+1) \times (p+1)}$ in $T_2$;

Evaluate sample covariance matrix $C_{X_2} \in R^{p \times p}$ in $T_2$;

Compute von Neumann divergence $D_{vN}(C_{X_1 Y_1} \| C_{X_2 Y_2})$;

Compute von Neumann divergence $D_{vN}(C_{X_2 Y_2} \| C_{X_1 Y_1})$;

Compute von Neumann divergence $D_{vN}(C_{X_1} \| C_{X_2})$;

Compute von Neumann divergence $D_{vN}(C_{X_2} \| C_{X_1})$;

$R(T_1 \| T_2) = \frac{1}{2}\left(D_{vN}(C_{X_1 Y_1} \| C_{X_2 Y_2}) + D_{vN}(C_{X_2 Y_2} \| C_{X_1 Y_1}) - D_{vN}(C_{X_1} \| C_{X_2}) - D_{vN}(C_{X_2} \| C_{X_1})\right)$.

FIG. 4B

MEASURING RELATEDNESS BETWEEN PREDICTION TASKS IN ARTIFICIAL INTELLIGENCE AND CONTINUAL LEARNING SYSTEMS

CROSS-REFERENCE TO PRIOR APPLICATION

Priority is claimed to U.S. Provisional Patent Application No. 62/948,350, filed on Dec. 16, 2019, the entire disclosure of which is hereby incorporated by reference herein.

FIELD

The present invention relates to a method and system for measuring how related prediction tasks are in artificial intelligence (AI) and continual learning systems, as well as to a method and system for using the relatedness measure to improve training of the respective systems, improve forward transfer, provide better predictions, detect concept drift, avoid catastrophic forgetting and/or perform improved feature selection.

BACKGROUND

Machine learning (ML) in general, and in particular lifelong learning (LLL), tries to investigate how two prediction problems are related and how this relation could benefit the training algorithm in inducing models that generalize well.

LLL develops the learning challenge further to the setting where the learner is exposed to a sequence of tasks $T_1, \ldots, T_j, \ldots$. In this setting, the learner is expected to learn the problem described by task $T_{i+1}$ without compromising its generalization ability on problems described by tasks $T_1, \ldots, T_i$. Most of the LLL methods divide the learning objective into two parts:

(1) Learning model(s): This component consists of the trained models that result after the sequential training phase on the presented tasks. Here some methods learn a single model such as elastic weight consideration (EWC) and gradient episodic memory (GEM), whereas other methods learn a linear model per task such as the efficient lifelong learning algorithm (ELLA).

(2) Knowledge base: This component characterizes the relations between tasks which have already been observed. This can be in the form of a graph that explicitly quantifies the relations between tasks.

SUMMARY

In an embodiment, the present invention provides a method for measuring relatedness between prediction tasks. The method includes receiving data for a first prediction task, and measuring the relatedness of the first prediction task to at least one previous prediction task as a difference between divergence of conditional probabilities of the tasks.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIG. 4A sets forth an exemplary algorithm for feature selection based on the task-relatedness measure according to an embodiment of the present invention;

FIG. 4B sets forth exemplary pseudocode for measuring relatedness between tasks according to an embodiment of the present invention;

DETAILED DESCRIPTION

Figure 1:
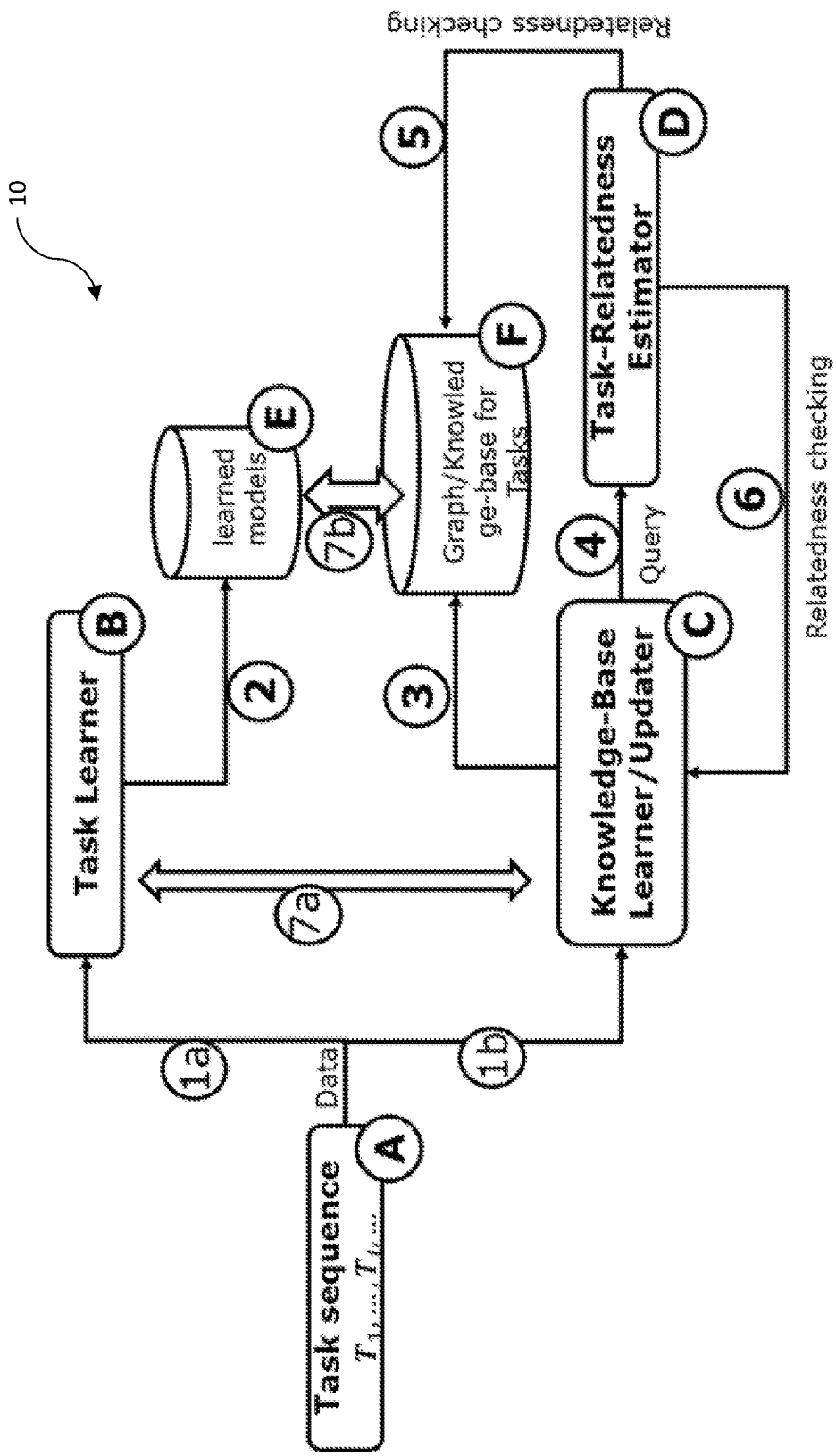
FIG. 1 schematically shows a continual task learning framework according to an embodiment of the present invention.

The inventors have recognized the problem that there is no efficient, well-defined method for the computation of relations between tasks that can used for the knowledge base induction.

Embodiments of the present invention provide a method and system which constructs a task-relatedness measure that is rooted in information theory. The estimation of such information can be especially advantageously applied to ML methods, and LLL methods in particular, in order to exploit any relations between tasks and thereby improve the forward transfer and decrease the catastrophic forgetting.

Embodiments of the present invention provide a task-relatedness measure that is both (i) efficient to compute, and (ii) improves the performance of ML methods in different embodiments such as multi-task learning, continual learning, concept change detection and feature selection. The relatedness measure can be used to improve training of the respective ML systems, improve forward transfer, provide better predictions, detect concept drift, avoid catastrophic forgetting and/or perform improved feature selection. Accordingly, embodiments of the present invention are able to improve the performance of the ML systems both in terms of quality and accuracy, as well as providing protections against system failures.

In an embodiment of the present invention, the task-relatedness measure is used to address the problem of concept drift detection. This problem occurs in systems for learning from data streams which consider the continuous observation of data while learning a single model. The learning algorithm according to this embodiment addresses two main aspects (i) the incremental learning such that each instance is observed only once, and (ii) adaptivity such that the learner should react to any change in the underlying data-generating processes. Thus, an embodiment of the present invention can inform the learner about a change in the distribution such that the learner adapts to these changes in order to retain its generalization performance.

Generally, data of a learning task is a set of data samples where each sample is a vector of features of fixed size and a target value. The target value is take from an output space Y that could be categorical, as in classification problems, or numerical, as in regression. The learning algorithm aims at fitting the function that generalizes well when predicting the target for instances that were not observed during the training phase. Better generalization is formulated as the reduction of the expected prediction loss for some underlying sampling distribution that generated the task.

Given two different task $T_i$ and $T_j$, each task is characterized by its corresponding input $X \in R^p$ (p is the dimensionality of input) and output $Y \in R^1$, a method and a measure are defined to estimate the relations between these two tasks. The measure takes a symmetric mathematical form as follows:

$$R(T_i, T_j) = 1/2(D(T_i \| T_j) + D(T_j \| T_i)), \quad (1)$$

in which $D(T_i \| T_j)$ is equivalent to:

$$D(T_i \| T_j) = D_{vN}(C_{X_i Y_i} \| C_{X_{pyj}}) - D_{vN}(C_{X_i} \| C_{X_j}), \quad (2)$$

where $D_{vN}(.\|.)$ is the relative entropy that will be shown later, $C_{XY} \in R^{(p+1) \times (p+1)}$ is the covariance matrix evaluated in the joint space of X and Y (input and output space) and $C_X \in R^{p \times p}$ denotes the covariance matrix evaluated on X. Further details on how this measure is derived and can be computed is also provided below. A small value of $R(T_i, T_j)$ denotes a strong relationship between $T_i$ and $T_j$. By contrast, a large value of $R(T_i, T_j)$ indicates a weak relationship between $T_i$ and $T_j$. In contrast to prior work, it is not required for all data sets to be relevant or similar. Rather, the approach according to an embodiment of the present invention can determine how similar and dissimilar tasks are by measuring the divergence between the mappings (or conditional distributions) of two tasks.

In an embodiment, the present invention provides a method for measuring relatedness between prediction tasks. The method includes receiving data for a first prediction task, and measuring the relatedness of the first prediction task to at least one previous prediction task as a difference between divergence of conditional probabilities of the tasks.

In an embodiment, the method further comprises receiving data for the at least one previous prediction task, inducing a model for each one of the first prediction task and the at least one previous prediction task and storing the models in a learned models database.

In an embodiment, the method further comprises adapting the models in the learned models database based on the measured relatedness between the first prediction task and the at least one previous prediction task.

In an embodiment, the method further comprises determining whether the data received for the first prediction task is for a new prediction task.

In an embodiment, the relatedness is measured as the difference between the von Neumann divergence of the conditional probabilities of the tasks.

In an embodiment, the method further comprises inducing a graph which connects the prediction tasks based on the measured relatedness, and using the graph to provide learned models for the prediction tasks in a multi-task learning setting.

In an embodiment, the method further comprises storing the measured relatedness in a database which includes relatedness information for other prediction tasks to the first prediction task and/or the at least one previous prediction task.

In an embodiment, the method further comprises applying the measured relatedness to determine a loss function for weighting of parameters which is used in a continual learning setting.

In an embodiment, the method further comprises applying the measured relatedness to detect a concept drift in a stream of the data, and adapting a model based on the detected concept drift.

In an embodiment, the method further comprises applying the measured relatedness for feature selection.

In an embodiment, the prediction tasks are for predicting a price or consumption of electricity for which an adaptive learning algorithm is applied, and the adaptive learning algorithm uses the measured relatedness to adapt learning such that predictions of the price or consumption of electricity are made in a manner which takes into account the measured relatedness.

In an embodiment, the data is historical sales data and the prediction tasks are sales predictions, and the measured relatedness is applied to induce a graph in a multi-task learning setting or to determine a loss function for weighting of parameters in a continual learning setting such that the sales predictions are made in a manner which takes into account the measured relatedness.

In an embodiment, the prediction tasks are for predicting demand or ridership of public transportation, the measured relatedness is applied to induce a graph in a multi-task learning setting or to determine a loss function for weighting of parameters in a continual learning setting such that dispatching of at least one public transportation vehicle is adjustable in a manner which takes into account the measured relatedness, and each of the prediction tasks is in a form of a triple including identifiers of a public transportation vehicle, a route of the public transportation vehicle and a stop of the public transportation vehicle.

In an embodiment, the relatedness is measured using equations (1) and (2).

In another embodiment, a system comprises one or more processors which, alone or in combination, are configured to provide for execution of a method according to an embodiment of the present invention.

In a further embodiment, a tangible, non-transitory computer-readable medium having instructions thereon is provided which, upon being executed by one or more processors, alone or in combination, provide for execution of a method according to an embodiment of the present invention.

FIG. 1 schematically illustrates a system 10 implementing a method for measuring task relatedness and improving models according to an embodiment of the present invention. The main components of the system 10 include:

(A) Task sequence: This component provides the input data comprising samples in the form of blocks. In each block, we have n samples $\{x_i, y_i\}_{i=1}^n$ from the same task. The task is either already observed before, or new to the system.

(B) Task learner: This component applies a task learning algorithm to induce models from the data from the task sequence component (A).

(C) Knowledge-base learner/updater: This component accumulates knowledge from new and old tasks, and creates a graph holding the explicit relations between tasks.

(D) Task-relatedness estimator: This component computes how tasks are related to each other, for example in the multi-task learning (MTL) setting (see equation (3) below), and how the new task is related to the previous ones, for example in the continual setting (see equation (5) below). The measuring of relatedness can be achieved through the application of equation (1) below.

(E) Learned models: This component is a repository of already trained models of the already observed tasks.

(F) Graph/knowledge-base for tasks: This component is a repository holding the information on how the already observed tasks are related to each other.

The components (A)-(D) of the system 10 can be, for example, comprised of one or more servers or processors with access to memory configured by software to perform the respective functions described above. The components (E) and (F) are preferably databases comprising physical memory which are accessible by at least the components (B)-(D). The components (E) and (F) can also include associated processors and communicate with each other, for example, for consolidation and update purposes.

According to the exemplary embodiment of the method for measuring task relatedness and improving models illustrated in FIG. 1, the following steps and dataflow take place:

(1a) and (1b) Data acquisition: In this stage, the arriving data is forwarded from the task sequence component (A) to the task learner component (B) in step (1a); and to the knowledge-base learner/updater component (C) in step (1b).

(2) Model learning phase: In this step, the task learner component (B) induces models from the data received in step (1a) and stores the models in the learned models component (E). Advantageously, the method according to an embodiment of the invention is agnostic to the particular type of learner used to induce models. Models for old tasks can be updated as more data comes in, but do not need to be updated. The model for a new task can be regularized according to an embodiment of the present invention by a strength of relatedness to previous tasks. Thus, inducing a model for a new task can use the relatedness measure to advantageously provide a more accurate initial model based on the relatedness to previous tasks.

(3) The knowledge-base learner/updater component (C) checks whether the arriving data from step (1b) belongs to a new task or not. This can be determined from prior information about known tasks.

(4) The knowledge-base learner/updater component (C) queries the task-relatedness estimator component (D) to find the relations of the new task to previous tasks.

(5) The task-relatedness estimator component (D) computes how the new task in a new block is related to the previous tasks.

(6) The task-relatedness estimator component (D) returns the estimated relatedness to the knowledge-base learner/updater component (C).

(7a) and (7b) Learning consolidation of the models and the graph of tasks. More specifically, in step (7a) learning the new tasks is regularized proportionally to their relatedness to previous tasks. In step (7b), the task relatedness updates the relatedness graph of the learned tasks.

In the following, embodiments of the present invention for computing the task-relatedness measure in multiple ML approaches are described, in particular, in a first embodiment for MTL, in a second embodiment for continual learning of tasks, in a third embodiment for concept drift detection and in a fourth embodiment for feature selection.

Figure 2:
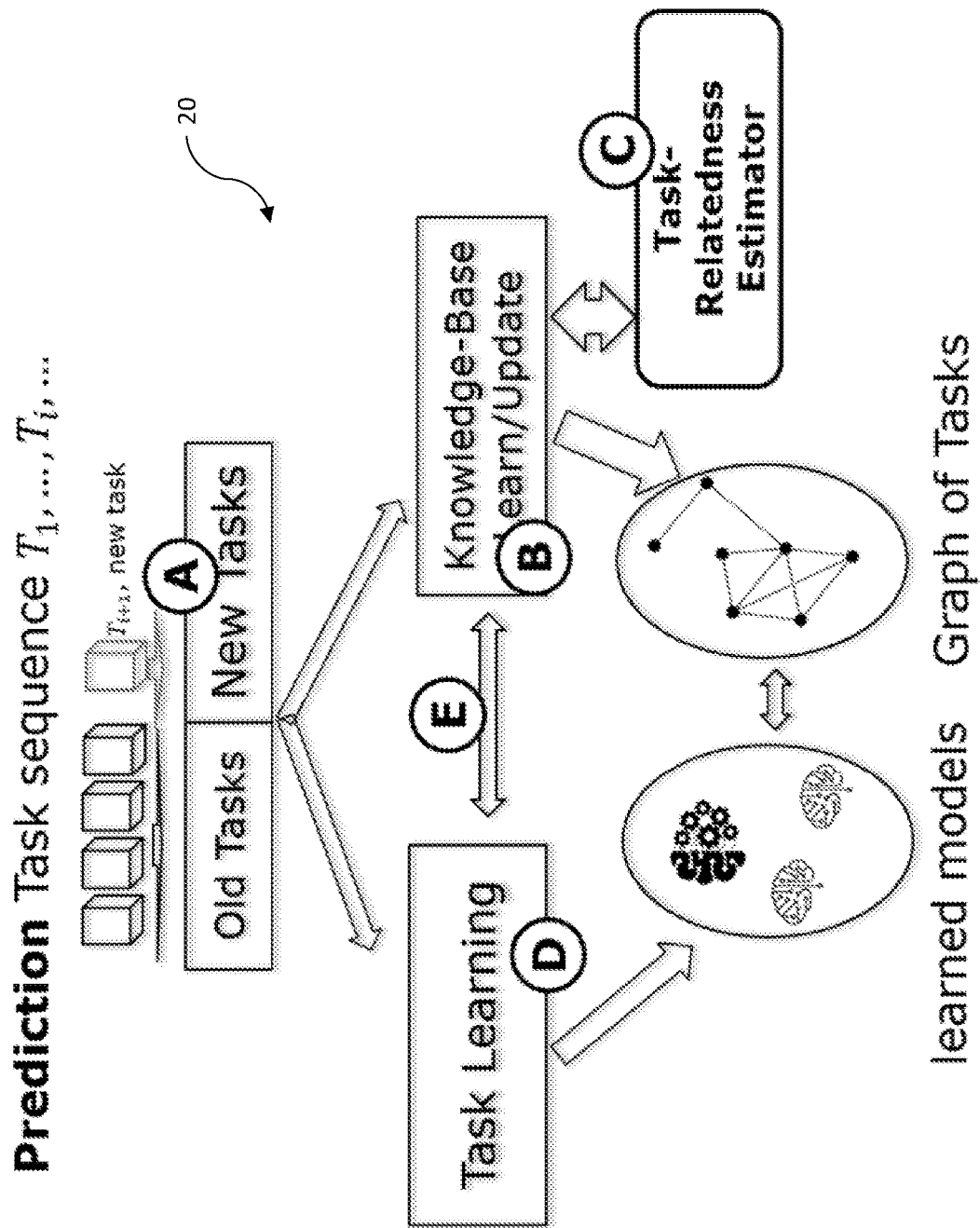
FIG. 2 schematically shows how old and new tasks are handled in a continual task learning framework according to an embodiment of the present invention.

In the first embodiment for MTL which is illustrated in FIG. 2, the learner is exposed to a number of tasks simultaneously and it is expected to learn from these tasks at once. Approaches such as CCMTL (see J. Kirkpatrick et al., "Overcoming catastrophic forgetting in neural networks," Proc. Nat. Acad. Sci., vol. 114, no. 13, pp. 3521-3526 (2017), which is hereby incorporated by reference herein) learn two parts: (i) a set of linear models (a model per task) and (ii) a graph connecting the tasks that serves the purpose of forcing connected tasks to have models that are similar. This can be seen in the following objective function:

$$\min_W \frac{1}{2}\sum_{t=1}^{T} \|W_t^T X_t - y_t\|_2^2 + \frac{\lambda}{2}\sum_{i,j \in G} \|W_i - W_j\|_2 \quad (3)$$

where $W \in R^p$ is the linear regression coefficient for the i-th task, $W=[W_1, W_2, \ldots, W_T] \in R^{p \times T}$ denotes the weight matrix constructed by the linear regression coefficient from all tasks. $\lambda$ is a regularization parameter and G is the k-NN graph on the learned models (i.e., W).

A weakness in such an approach is that initialization of the graph G is carried out after initializing W by performing linear regression on each task separately. This corresponds to connecting two tasks only if their linear solutions are close in the Euclidian space. In contrast, the advantage of applying the task-relatedness measure according to embodiments of the present invention (instead of k-NN initialization) becomes clear when the initialized graph connects tasks based on the underlying generating distribution, and thus captures relations between the tasks in a more consistent way.

The second embodiment for continual learning of tasks is also illustrated in FIG. 2. Continual learning methods, as opposed to the MTL setting, receive tasks in a sequence and aim at learning the new tasks without compromising the performance on previous tasks (catastrophic forgetting), as shown in FIG. 1. Approaches such as elastic weight consolidation (EWC) regularizes the learning such that parameters of a neural network that are important to the previous tasks should suffer from a smaller change compared to the other parameters as follows:

$$L(\theta) = L_{T+1}(\theta) + \sum_{i=1}^{T}\sum_{j} \frac{\lambda}{2} F_j(\theta_j - \theta_{i,j}^*)^2, \quad (4)$$

where L is the loss function, $\theta$ is the set of networks' parameters. For example, $L(\theta)$ denotes the overall loss over T+1 tasks, whereas $L_{T+1}(\theta)$ denotes the loss only on the (T+1)-th task. $F_j$ represents the parameter's importance in terms of the Fisher information matrix, $\theta^*_{i,j}$ is the j-th parameter learned from the i-th task.

The task-relatedness measure according to this embodiment of the present invention for continual learning of tasks would contribute to continual learning by an informed regularization term that considers the relation between tasks when applying the Fisher weighting on the set of parameters B. Hence, the loss can be written as:

$$L(\theta) = L_{T+1}(\theta) + \sum_{i=1}^{T}\sum_{j} \frac{\lambda R(T+1, i)}{2} F_j(\theta_j - \theta_{i,j}^*)^2, \quad (5)$$

where R(T+1,i) denotes the task-relatedness measure between task T+1 and task i ($1 \leq i \leq T$).

Thus, as shown in FIG. 2, a method 20 can provide for improvements in the MTL and continual learning setting using the components identified in FIG. 1. The steps of the method 20 shown in FIG. 2 include:

(A) A sequence of blocks belonging to a sequence of old or new tasks are received, where $T_{i+1}$ represents a new task.
(B) It is checked whether the received data belongs to an old or new task. Also, based on the results of step (C) below, a graph of tasks holding the information showing the relatedness is updated.
(C) The relatedness measure of a new task to a previous task is determined, and the relatedness measure is used to update the graph of tasks.
(D) In parallel, or before or following steps (B) and (C) models are learned for the tasks from the received data.
(E) The relatedness measure is used to adapt the learned models. The task-relatedness graph is constructed by evaluating the task-relatedness measure on pairwise tasks. If the task-relatedness measure is larger than a threshold, there is an edge to connect the corresponding two tasks. In order to constrain the total number of edges in the graph, one can just connect each task with its surrounding k tasks, where k is a predefined integer. In this sense, the new task will also update edge that already exists.

In the third embodiment for concept drift detection, the relatedness measure can be used to detect a change in concept in streaming data. Learning from data streams is a field in ML that considers the continuous observation of data while learning a single model. The learning algorithm here addresses two main aspects (i) the incremental learning such that each instance is observed only once, and (ii) adaptivity such that the learner should react to any change in the underlying data-generating processes. Many stream learning methods initiate active updates to the learned model upon discovering a concept change triggered by a concept drift detection method. Gama et al., "A survey on concept drift adaptation," ACM Computing Surveys, Vol. 46, Issue 3 (April 2014), which is hereby incorporated by reference herein, shows that drift detection approaches are dominated by methods that consider the deterioration of the learner's performance as the only aspect for detecting a change, such as statistical process control (SPC), exponentially weighted moving average (EWMA) for concept drift detection (ECDD), and adaptive windowing (ADWIN).

In contrast, using the task-relatedness approach according to embodiments of the present invention, a concept change can be easily detected by considering the relatedness measure using equation (1), where $T_i$ and $T_{i+1}$ are the tasks created from two consecutive sliding windows of data.

Figure 3:
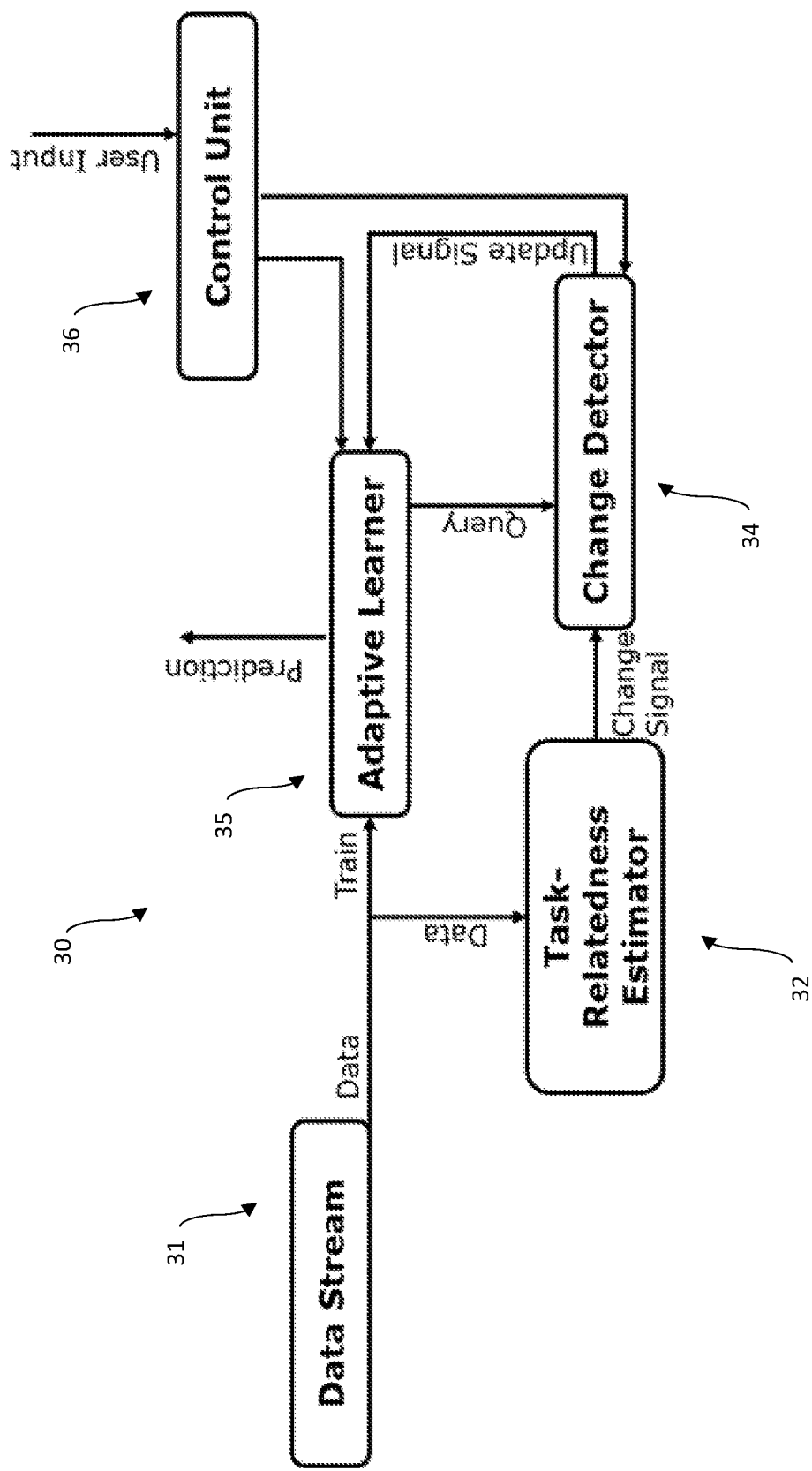
FIG. 3 schematically shows a system architecture of a system for learning from data streams according to an embodiment of the present invention.

FIG. 3 shows an illustration of a framework 30 for learning from a data stream 31 where the task-relatedness estimator 32 triggers and signals an adaptive learner 35 about any occurrence of a change determined by a change detector 34. For example, the task-relatedness estimator 32 uses equation (1) above to detect a change and, based thereon, sends a change signal to the change detector 34, which can be queried by the adaptive learner 35. The change detector 34 in response to the change signal and/or the query sends an update signal to the adaptive learner to inform the adaptive learner about the detected change. Alternatively, the adaptive learner 35 can communicate directly with the task-relatedness estimator to be informed of any detected changes. A control unit 36 can allow for user input to impose conditions on or adapt the change detector 34 and/or adaptive learner 35. The adaptive learner 35 is incrementally trained on the data stream 31 to make predications and this learning is adapted based on the detected change in the data stream 31. The simplest way to update adaptive learner 35 is to use the training samples from the new concept to re-train a predictive model.

The fourth of embodiment for feature selection uses the relatedness measure to improve and simplify feature selection. Given a set of variables $S=\{X_1, \ldots, X_n\}$, feature selection refers to seeking the small subset $S^* \subset S$ of the original variables, such that $S^*$ contains the most relevant yet least redundant information about a desired variable Y. For example, in order to seek k features, then the ultimate objective from the perspective of information theory becomes maximizing the mutual information $I(y; \{X_{i_1}, \ldots, X_{i_k}\})$, where $i_1, \ldots, i_k$ denote the indices of selected variable.

Assuming there is a set of "useless" features (denoted $\{\tilde{X}_{i_1}, \ldots, \tilde{X}_{i_k}\}$) that has no predictive power to y, then the mutual information $I(y; \{\tilde{X}_{i_1}, \ldots, \tilde{X}_{i_k}\})$ is zero. In this sense, one can select k features $\{X_{i_1}, \ldots, X_{i_k}\}$ such that the relatedness between data sets $T_i$ and $T_j$ is minimum, in which $T_i$ is characterized by input set $\{X_{i_1}, \ldots, X_{i_k}\}$ and output set y, whereas $T_j$ is characterized by input set $\{\tilde{X}_{i_1}, \ldots, \tilde{X}_{i_k}\}$ and output set y.

The procedure shown in FIG. 4A in the form of pseudocode illustrates an algorithm for employing the task-relatedness measure for the selection of the kth most informative features. In contrast to prior work, an embodiment of the present invention does not require to compute the density function since it works on the covariance matrix, therefore being more computationally efficient.

In the following, exemplary applications of the task-relatedness measure are described according to embodiments of the present invention. These exemplary applications are in different technical areas. In a first exemplary application, the task-relatedness measure is applied for predicting electricity prices (or consumption), in a second exemplary application the task-relatedness measure is applied, in both the MTL and continual learning settings, for retail sales prediction and in a third exemplary application the task-relatedness measure is applied for transport demand and ridership prediction.

With respect to the first exemplary application, the problem of forecasting the prices of electricity in a specific region (e.g., country) has been intensively studied by the learning from data streams community. Predicting the consumption of electricity is important since it helps provider for better planning without having shortage or interruption of the services. This problem is specifically difficult since it runs in the setting of non-stationary environments. Many works propose approaches that react to changes after discovering a drop in the predictor's performance. The relatedness measure according to embodiments of the present invention overcomes this challenge by detecting the change merely from the data and, thus, achieves a more accurate indicator for adaptive learning algorithms to respond quicker to changes, which leads to achieving a better adaptive generalization performance.

With respect to the second exemplary application, this relates to one important application of ML methods, which is the prediction of products' sales merely from the collected sales historical data. One problem that can be solved by accurate sales predictions is that shop owners can avoid the over-stocking of unwanted products on their shelves and, at the same time, they can also be prepared for the changing demand for products. Moreover, in one embodiment of the present invention, the sales' prediction of new products can help shop owners anticipate the demand of products that have not been seen before. For the sales prediction, the approach according to embodiments of the present invention can be employed in two different scenarios:

1. MTL Setting: All products are available at once. In this setting, each product is considered as a task and, hence, the task-relatedness measure is applied to initialize the graph of task in CCMTL (see J. Kirkpatrick et al., "Overcoming catastrophic forgetting in neural networks," Proc. Nat. Acad. Sci., vol. 114, no. 13, pp. 3521-3526 (2017)).
2. Continual Learning Setting: Products are observed in sequence. In this setting also, each product is considered as a task with the aim of learning new tasks without degrading the performance on the previous products. When considering linear models for the learned tasks, the task-relatedness measure can be applied to evaluate the relatedness between the new task and each of the available tasks and then initialize the graph of tasks; this step is essential for the functionality of CCMTL (see J. Kirkpatrick et al., "Overcoming catastrophic forgetting in neural networks," Proc. Nat. Acad. Sci., vol. 114, no. 13, pp. 3521-3526 (2017)). On the other hand, when a neural network is used for the learning of all the tasks (as in the single-headed architecture) the task-relatedness measure according to embodiments of the present invention can be employed to weight the parameters of the network in order to cause less change to the important parameters of a related task.

With respect to the third exemplary application, which is in the domain of public transportation, knowing the traveling habits of customers leads to better informed decisions in dispatching, routing and scheduling transportation means such as buses. This also increases the traveler's satisfaction and trust in the transport provider, and thus, maintaining the profit. Without loss of generality, the following examples focus on public transportation using buses, but are also applicable to other modes of public transportation, individually or as a whole. Here, two prediction problems could be formulated: (i) prediction of passenger count that is going to board the bus at a given stop and a time, i.e., demand prediction; and (ii) the number of passengers riding a given bus at a given location between two stops, i.e., ridership prediction. Solving each of the aforementioned problems can be achieved similar to the previous application. To this end, each triple of (bus, route, stop) is considered as a task, that is used for the multi-task or the continual learning. Therefore, the task-relatedness measure according to embodiments of the present invention would be employed for the MTL setting at the initialization phase of the graph (see equation (3) above), and in the continual setting, by regularizing the update of parameters by the task-relatedness (see equation (5) above).

Figure 5:
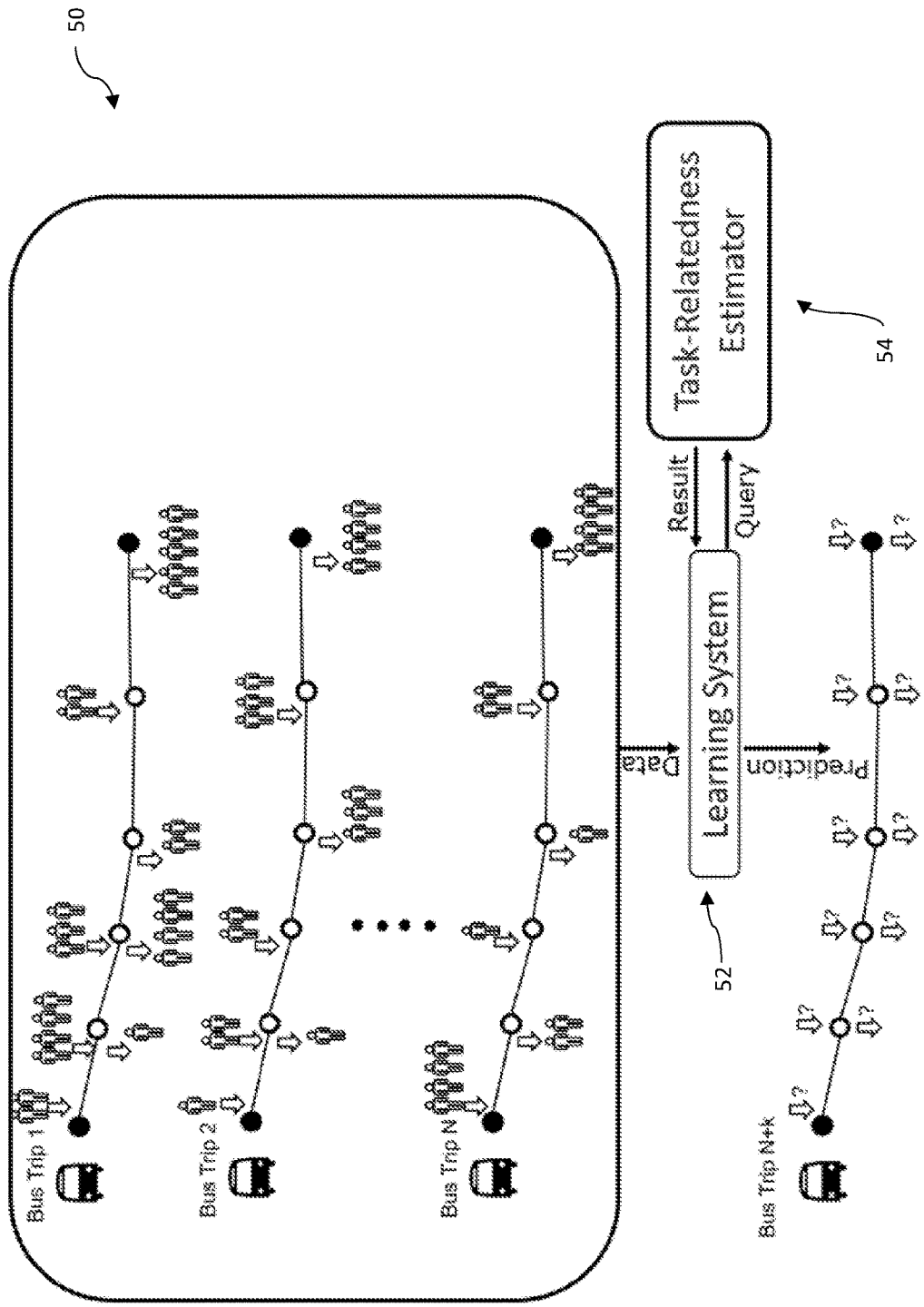
FIG. 5 schematically illustrates a demand prediction system for providers of bus transportation.

FIG. 5 illustrates how the task-relatedness estimator can be used in a demand prediction system 50 using the example of buses. Data is received indicating, for example, how many passengers got on and off at different bus stops and on different bus trips 1, 2 . . . N, for example, for the same bus route at different times of the day or for different bus routes. This data is fed into a learning system 52 which uses it to induce models and make a prediction for a future bus trip N+k on the same or different route how many passengers will get on and off the bus at the different bus stops. The learning system 52 communicates with a task-relatedness estimator 52 to apply the task-relatedness measure in the MTL and/or continual learning setting as described above, for example, by treating each triple of (bus, route, stop) as a task using the relatedness measure to improve the predictions by the learning system 52.

Given an unsupervised task T that contains $X \in R^{n \times p}$, where n is the size of the data and p is the dimensionality, one can compute the (normalized) Gram matrix K obtained from evaluating a positive definite kernel K (e.g., the radial basis function (RBF) kernel $$\kappa(x_i, x_j) = \exp\left(-\frac{\|x_i - x_j\|^2}{2\sigma^2}\right)$$

on all pairs of exemplars (i.e., $K_{i,j} = \kappa(x_i, x_j)$ of size n×n) (see S. Yu et al., "Multivariate extension of matrix-based Renyi's α-order entropy functional," IEEE Transactions on Pattern Analysis and Machine Intelligence (2019), which is hereby incorporated by reference herein) or a simple (normalized) covariance matrix C of size p×p.

This matrix that is obtained in a data-driven manner from the raw data exhibits properties such as being positive semidefinite, symmetric, and have trace1. Hence, it can be seen as a "density matrix" in the physical sense and therefor can be employed for information theoretic measures that are rooted in quantum physics. For two density matrices ρ and σ, the von Neumann entropy (in quantum physics) is defined as follows:

$$S(\sigma) = -Tr(\sigma \log_2 \sigma) \qquad (6)$$

and the relative entropy as:

$$D_{vN}(\sigma \| \rho) = Tr(\sigma \log_2 \sigma - \sigma \log_2 \rho - \sigma + \rho) \qquad (7)$$

(see M. A. Nielsen and I. L. Chuang, Quantum Computation and Quantum Information, 10th ed. Cambridge University Press (2011), which is hereby incorporated by reference herein).

Since embodiments of the present invention apply to the supervised setting, in the following, an information theoretic task-relatedness measure is derived based on the von Neumann divergence that finds its roots in the quantum setting.

For a single task T, the essence of any existing (supervised) machine learning algorithm is to estimate a mapping function $f$ that satisfies $y = f(x)$.

Given two tasks, each one is represented by predictor X and a dependent variable Y, i.e., $T_1 = \{X_1, Y_1\} \in R^{n_1 \times p} \times R^{n_1}$ and $T_2 = \{X_2, Y_2\} \in R^{n_2 \times p} \times R^{n_2}$, where $T_1$ and $T_2$ are required to have the same number of predictors, but not the same number of samples. The relatedness between these two tasks $T_1$ and $T_2$ is treated as the divergence between their mapping functions $f_1$ and $f_2$, i.e., $D(f_1 \| f_2)$. From a probabilistic perspective, this is equivalent to estimating $D(P_{T_1}(y|x) \| P_{T_2}(y|x))$, where $P_{T_i}(y|x)$ is the posterior probability according to task $T_i$. The relatedness between two tasks is defined as a measure that can be computed according to an embodiment of the present invention using the equations (1) and (2) above. This formulation is derived and inspired by the fact that Kullback-Leibler (KL) divergence of conditional probabilities takes the form:

$$D_{kl}(P_{T_i}(y|x) \| P_{T_j}(y|x)) = D_{kl}((P_{T_i}(y,x)) \| (P_{T_j}(y,x))) - D_{kl}((P_{T_i}(x)) \| (P_{T_j}(x))) \qquad (8)$$

With respect to the computation of von Neumann entropy and divergence, to avoid the problem of zero eigenvalues, i.e., there is no matrix exponential or logarithm, embodiments of the present invention provide here equivalent expressions for both the von Neumann entropy $S(\sigma)$ and the von Neumann divergence $D_{vN}(\sigma \| \rho)$. To this end, let $\sigma = V \Lambda V^T$ and $\rho = U \Theta U^T$, then the entropy can be written as follows:

$$S(\sigma) = -Tr(\sigma \log_2 \sigma) = \Sigma_i \lambda_i \log_2 \lambda_i \qquad (9)$$

and the divergence as follows:

$$D_{vN}(\sigma\|\rho) = Tr(\sigma \log_2 \sigma - \sigma \log_2 \rho - \sigma + \rho) \quad (10)$$
$$= \sum_i \lambda_i \log_2 \lambda_i - \sum_{i,j}(v_i^T u_j)^2 \lambda_i \log_2 \theta_j - \sum_i (\lambda_i - \theta_i)$$

Embodiments of the present invention provide for one or more of the following improvements/advantages:
1) Estimating task-relatedness as the difference between the von Neumann divergence of the conditional probabilities of the tasks.
2) Defining how the task-relatedness is applied to induce the graph in the MTL setting (see equation (3) above), and to regularize the learning of tasks in the continual learning setting (see equation (5) above).
3) Defining the task-relatedness measure that is also applied to detect concept change in learning from data streams (see equation (6) above), and performing feature selection as in Algorithm 1 (see FIG. 4A).
4) Improving computational performance and accuracy in determining task-relatedness, thereby helping to avoid faulty learning models.

According to an embodiment of the present invention, a method for computing a task-relatedness measure comprises the following steps:
(1a) and (1b) acquiring data;
(2) model learning phase;
(3) The knowledge-base learner/updater component (C) checks whether the arriving data belongs to a new task or not.
(4) The knowledge-base learner/updater component (C) queries the task-relatedness estimator component (D) to find the relation to previous tasks.
(5) The task-relatedness estimator component (D) computes how a new task in a new block is related to the stored previous tasks.

According to an embodiment of the present invention, a method for computing a task-relatedness measure comprises the following steps:
(1a) and (1b) acquiring data;
(4) The knowledge-base learner/updater component (C) queries the task-relatedness estimator component (D) to find the relation to previous tasks.
(5) The task-relatedness estimator component (D) computes how a new task in a new block is related to the stored previous tasks.

Embodiments of the present invention provide a simple yet effective way to address a fundamental problem in ML that can improve numerous AI applications. The methodology according to an embodiment of the present invention can be implemented in 10 or 20 lines of Python or MATLAB code (see FIG. 4B for the pseudocode), but has a solid mathematical foundation. By contrast, state-of-the-art methodologies rely either on probability distribution estimation in high-dimensional space (which is time consuming and imprecise) or on evaluated machine learning models (which depends large on model characteristics).

The improvements and solution have been verified in two applications: 1) the task-relatedness measure in the scenario of MTL; and 2) feature selection.

First, with respect to the task-relatedness measure in the scenario of MTL, data from 29 tasks were collected from various landmine fields (a benchmark data set). Each object in this data is represented by a 9-dimensional feature vector and the corresponding binary label (1 for landmine and 0 for clutter). The feature vectors were extracted from radar images, concatenating four moment-based features, three correlation-based features, one energy ratio feature and one spatial variance feature. Among these 29 tasks, tasks 1-15 correspond to regions that are relatively highly foliated and tasks 16-29 correspond to regions that are bare earth or desert. Thus, it was expected that there are approximately two clusters in the task-relatedness matrix corresponding to two classes of ground surface condition.

Based thereon, the performance of the task-relatedness measure according to an embodiment of the present invention (see equation (1) above) was determined on the 29 different tasks. This embodiment of the present invention is based on von Neumann divergence. One can substitute the von Neumann divergence with the log-determinant divergence or the famed KL divergence.

Figure 6C:
FIGS. 6A-C respectively show a comparison of von Neumann divergence, log-determinant divergence and KullbackLeibler (KL) divergence on landmine detection data set.
Figure 6B:
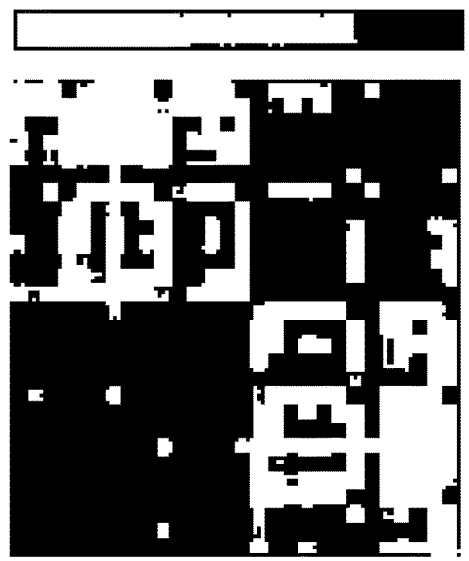
Figure 6A:
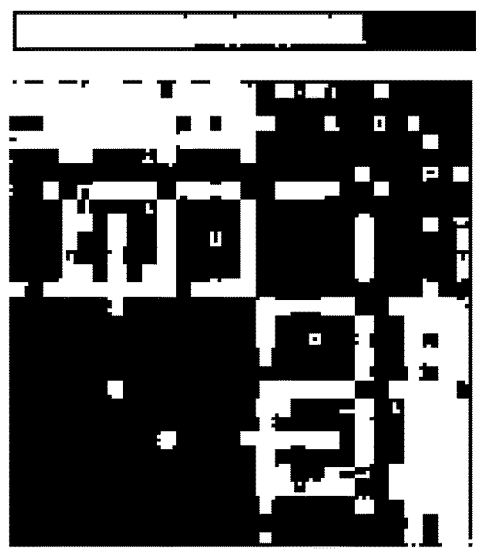

FIGS. 6A-C demonstrate the task-relatedness matrix evaluated with the three competitors. It is not surprising that the performance of log-determinant divergence and the KL divergence is similar. By contrast, the von Neumann divergence performs better in extracting task-relatedness. One possible reason is because the data is not Gaussian.

Second, with respect to feature selection, to further demonstrate the improvements provided by embodiments of the present invention, feature selection was performed on three benchmark data sets. The first one is the breast data set which has 569 samples, and each sample is in a 30 dimensional space. The second one is the ORL data set that has 400 samples in a 1,024 dimensional space. The last one is the semeion data set that has 1,593 samples in a 256 dimensional space. It is noted that the features in semeion are binomial distributed, which is significantly different from Gaussian.

For all data sets, 10 features were selected and the linear Support Vector Machine (SVM) was used as the baseline classifier. The classification accuracies with respect to different numbers of features (averaged over 10 fold cross-validation) are presented in FIGS. 7A-C. As can be seen, the von Neumann divergence can always achieve desirable performance, regardless of the data distributions. For Gaussian data, the von Neumann divergence and the KL divergence perform similarly. However, the KL divergence performs poorly for non-Gaussian data.

Embodiments of the present invention involve covariance matrix estimation. Although sample covariance matrix is widely used in different industrial applications, a precise and stable covariance matrix estimation with limited data is still a challenging problem. One should note that other state-of-the-art methodologies also suffer from the performance limitation under limited samples.

According to embodiments of the present invention, the task-relatedness brings a quite distinctive advantage on the learning of the new and previous tasks, in particular increased performance on all tasks in general, and the new task in specific. This can be exemplified by providing specifically generated datasets and observing good performance on previous and new tasks compared to performances according to the state of the art or when no changes for task-relatedness are made. In addition to enhanced performance, the task-relatedness measure can also be used to avoid faulty learned models.

In the following, particular embodiments of the present invention are described. It will be understood by a person having ordinary skill in the art that different terminology may be used in the following description of embodiments as in the foregoing description of embodiments, and that features described above and below can be used in various combinations.

In the following, a simple, but effective way to measure the discrepancy between two conditional distributions is described. The new measurement is motivated by the von Neumann divergence on density matrices in quantum physics. It is illustrated in the following the new measurement's connection to previous efforts and two applications of this new measurement are described, namely the task-relatedness extraction and the feature selection.

Discrepancy or divergence between two distributions plays a significant role in the ML community. Possible applications of measuring the discrepancy between two distributions include change detection, reinforcement learning, or the recently developed variational autoencoders (VAE). Unfortunately, the accurate measure of discrepancy between two distributions is a notoriously hard problem. This problem becomes more severe if measuring the discrepancy between two conditional distributions and both distribution are in a high-dimensional space. To address this issue, previous efforts can be generally divided into two categories. The first kind of approach aims to precisely estimate the two (conditional) distributions with either a k-NN estimator or a Parzen window density estimator. By contrast, the second kind of approach represents discrepancy between distributions as distances between mean embeddings of features in another space (typically a kernel space). Notable methods include the Maximum Mean Discrepancy (MMD) and its recent implementations using a deep neural networks. Technically, the first approach suffers from high-dimensionality of given data, whereas the second approach always requires high computational burden and careful hyper-parameter tuning. Different from previous efforts, an embodiment of the present invention provides an efficient and hyper-parameter free way to measure the discrepancy between two conditional distributions that can be implemented in 10 or 20 lines of Python or MATLAB codes. There are numerous machine learning applications which can be improved using the new measurement.

For density matrices $\rho$ and $\sigma$, the von Neumann entropy (in quantum physics) is defined by equation (6) above and the relative entropy is defined by equation (7) above.

The von Neumann divergence is a special case of the Bregman divergence $D_{\phi,B}$, which is defined on set $S_{++}^p$, (the set of all p×p is denoted as $S_{++}^p = A \in \mathbb{R}^{p \times p} | A = A^T, A \succ 0$:

$$D_{\phi,B}(\sigma \| \rho) = \phi(\sigma) - \phi(\rho) - \langle \nabla \phi(\rho), \sigma - \rho \rangle \quad (11)$$

where $\langle \sigma, \rho \rangle = tr(\sigma\rho)$. $\phi(\sigma) = tr(\sigma \log_2 \sigma - \sigma)$ yields the von Neumann divergence. On the other hand, $\phi(\sigma) = -\log_2 |\sigma|$ yields the log-determinant divergence:

$$D_{\ell D}(\sigma \| \rho) = tr(\rho^{-1} \sigma) + \log_2 \frac{|\rho|}{|\sigma|} - p \quad (12)$$

In data-driven applications, it is not limited in having a quantum setup where the matrix $\rho$ can be called a "density matrix" in the physical sense. Instead, it is possible to define a matrix from data that satisfies the same mathematical properties of a density matrix (i.e., positive semidefinite, symmetric, and with trace 1). Such a matrix is not difficult to obtain from raw data.

Given a data set $X \in \mathbb{R}^{n \times p}$, where n is the cardinality and p is the dimensionality, the density matrix can be defined with either a (normalized) Gram matrix K obtained from evaluating a positive definite kernel κ (preferably, the radial basis function (RBF) kernel $$\kappa(x_i, x_j) = \exp\left(-\frac{\|x_i - x_j\|^2}{2\sigma^2}\right)$$

on all pairs of exemplars (i.e., $K = \kappa(x_i, x_j)$ of size n×n) or a simple (normalized) covariance matrix C of size p×p.

To avoid the problem of zero eigenvalues, i.e., there is no matrix exponential or logarithm, equivalent expressions are presented here for both the von Neumann entropy $S(\sigma)$ and the von Neumann divergence $D(\sigma \| \rho)$. Let $\sigma = V \Lambda V^T$ and $\rho = U \Theta U^T$, the von Neumann entropy is as in equation (9) above, and the divergence as in equation (10) above.

A problem formulation is used as follows: Given two groups of jointly distributed random variables, i.e., $\{X_1, Y_1\}$ and $\{X_2, Y_2\}$, suppose $X_1$ and $X_2$ have dimensionality $p_1$, whereas $Y_1$ and $Y_2$ have dimensionality $p_2$, the goal is to evaluate the discrepancy between the conditional distributions of $P(Y_1 | X_1)$ and $P(Y_2 | X_2)$ only using the raw data (without evaluating or training any models on $\{X_1, Y_1\}$ and $\{X_2, Y_2\}$). The two groups of random variables are not required have the same number of samples, that is, $X_1$, $Y_1$ is characterized by $n_1$ samples, whereas $X_2$, $Y_2$ is characterized by $n_2$ samples, and $n_1$ is not necessary to be equal to $n_2$.

As discussed above, the divergence between $X_1$ and $X_2$ can be evaluated using the von Neumann divergence between two density matrices, wherein each density matrix is a characterization of the corresponding data set. On the other hand, if D is the Kullback-Leibler (KL) divergence, it follows that:

$$D_{KL}(P(Y_1|X_1) \| P(Y_2|X_2)) = D_{KL}(P(X_1, Y_1) \| P(X_2, Y_2)) - D_{KL}(P(X_1) \| P(X_2)) \quad (13)$$

Accordingly, the discrepancy between two posterior distributions can be measured with the following formula:

$$D(P(Y_1|X_1) \| P(Y_2|X_2)) = D_{vN}(C_{X_1 Y_1} \| C_{X_2 Y_2}) - D_{vN}(C_{X_1} \| C_{X_2}) \quad (14)$$

where $C_{XY} \in \mathbb{R}^{(p_1+p_2) \times (p_1+p_2)}$ is the covariance matrix evaluated in the joint space of X and Y, whereas $C_X \in \mathbb{R}^{p_1 \times p_1}$ denotes the covariance matrix evaluated on X.

Given $X_1$ and $X_2$, the divergence of $X_1$ is measured with respect to $X_2$ as the von Neumann divergence between their covariance matrices $C_1$ and $C_2$, i.e., as follows:

$$D_{vN}(X_1 \| X_2) = tr(C_1 \log_2 C_1 - C_1 \log_2 C_2 - C_1 + C_2) \quad (15)$$

If the von Neumann divergence is substituted with the log-determinant divergence mentioned above, the following is obtained:

$$D_{\ell D}(X_1 \| X_2) = tr(C_2^{-1} C_1) + \log_2 \frac{|C_2|}{|C_1|} - p \quad (16)$$

In the case both $X_1$ and $X_2$ follow a multivariate Gaussian distribution, i.e., $X_1 \sim N(\mu_1, C_1)$ and $X_2 \sim N(\mu_2, C_2)$, then the KL divergence of $X_1$ with respect to $X_2$ is expressed:

$$D_{KL}(X_1 \| X_2) = \\ \frac{1}{2}\left\{tr(C_2^{-1} C_1) + (\mu_2 - \mu_1)^T C_2^{-1} (\mu_2 - \mu_1) - p + \log_2 \frac{|c_2|}{|c_1|}\right\} \quad (17)$$

where p is the dimension of $X_1$ (or $X_2$).

As can be seen, apart from a scalar 1/2, the log-determinant divergence on the covariance matrix only differs from the KL divergence on multivariate Gaussian with the term $(\mu_2-\mu_1)^T C_2^{-1}(\mu_2-\mu_1)$, which can be interpreted as the Mahalanobis Distance between the mean vectors $\mu_1$ and $\mu_2$ (under the distribution of $X_2$).

In this sense, it can be seen that using the divergence in covariance matrix has a mathematical foundation, and $D_{lD}(C_1\|C_2)$ enjoys a geometric interpretation. Compared to $D_{lD}(C_1\|C_2)$, one can imagine $D_{vN}(C_1\|C_2)$ as a measure in the quantum setting.

Given two tasks, each one is represented by predictor X and dependent variable Y, i.e., $T_1=\{X_1,Y_1\}$, $X_1 \in \mathbb{R}^{n1 \times p}$, $Y_1 \in \mathbb{R}^{n1}$, and $T_2=\{X_1,Y_2\}$, $X_2 \in \mathbb{R}^{n2 \times p}$, $Y_2 \in \mathbb{R}^{n2}$. For a single task T, the essence of any existing (supervised) machine learning algorithm is to estimate a mapping function $f$ that satisfies $Y=f(X)$. Therefore, the task-relatedness between $T_1$ and $T_2$ is treated as the divergence between their mapping functions $f_1$ and $f_2$, i.e., $D(f_1\|f_2)$. From a probabilistic perspective, this is equivalent to estimate $D(P(Y_1\|X_1)\|P(Y_2\|X_2))$.

To demonstrate the computational improvements provided by embodiments of the present invention, data from 29 tasks were collected from various landmine fields. Each object in a given data set was represented by a 9-dimensional feature vector and the corresponding binary label (1 for landmine and 0 for clutter). The feature vectors were extracted from radar images, concatenating four moment-based features, three correlation-based features, one energy ratio feature and one spatial variance feature.

The landmine detection problem was modeled as a binary classification problem. The objective was to learn a classifier from the labeled data, with the goal of providing an accurate prediction for an unlabeled feature vector. Classification of each data set was treated as a learning task and the performance of the von Neumann divergence, the log-determinant divergence, and the KL divergence on measuring the task-relatedness were measures. For each divergence, the task-relatedness was measured as:

$$D(P(Y_1|X_1)\|P(Y_2|X_2))=D(\{X_1,Y_1\}\|\{X_2,Y_2\})-D(X_1\|X_2) \quad (18)$$

Among these 29 data sets, 1-15 correspond to regions that are relatively highly foliated and 16-29 correspond to regions that are bare earth or desert. Thus, it was expected that there would be approximately two clusters in the task-relatedness matrix corresponding to two classes of ground surface condition. FIGS. 6A-6C demonstrate the task-relatedness matrix evaluated with the three competitors, with FIG. 6A showing $D_{vN}(C_1\|C_2)$, FIG. 6B showing $D_{lD}(C_1\|C_2)$ and FIG. 6C showing $D_{KL}(X_1\|X_2)$. It is not surprising that the performance of log-determinant divergence and the KL divergence is similar. By contrast, the von Neumann divergence performs better in extracting task-relatedness. One possible reason is because the data is not Gaussian.

Given a set of variables $S=\{X_1, X_2, \ldots, X_n\}$, feature selection refers to seeking a small subset of information variables $S^* \subset S$ from S, such that the subset $S^*$ contains the most relevant yet least redundant information about a desired variable Y. Suppose it is desired to seek k features, then the ultimate objective from the perspective of information theory becomes maximizing $I(y; \{X_{i_1}, X_{i_2}, \ldots, X_{i_k}\})$, where $i_1, i_2, \ldots, i_k$ denote the indices of selected variable, and I denotes mutual information.

Suppose there is a set of "useless" features that has the same size as $\{X_{i_1}, X_{i_2}, \ldots, X_{i_k}\}$ and has no predictive power to y, denoted as $\{\tilde{X}_1, \tilde{X}_2, \ldots, \tilde{X}_k\}$, then the ultimate objective is equivalent to maximize $D_{KL}(P(y|\{X_{i_1}, X_{i_2}, \ldots, X_{i_k}\})\|P(y|\{\tilde{X}_1, \tilde{X}_2, \ldots, \tilde{X}_k\}))$. This is because:

$$\max D_{KL}(P(y|\{X_{i_1},X_{i_2},\ldots,X_{i_k}\})\|P(y|\{\tilde{X}_1,\tilde{X}_2,\ldots,\tilde{X}_k\}))$$

$$\Leftrightarrow \max D_{KL}(P(y|\{X_{i_1},X_{i_2},\ldots,X_{i_k}\})\|P(y))$$

$$\Leftrightarrow \max D_{KL}(P(y,\{X_{i_1},X_{i_2},\ldots,X_{i_k}\})\|P(y)P(\{X_{i_1},X_{i_2},\ldots,X_{i_k}\}))$$

$$\Leftrightarrow \max I(y;\{X_{i_1},X_{i_2},\ldots,X_{i_k}\}), \quad (19)$$

where the last line is by the definition of mutual information.

Instead of maximizing the conditional KL divergence, its von Neumann alternative is resorted according to an embodiment of the present invention as shown in equation (18), i.e., as follows:

$$D_{vN}(P(y|\{X_{i_1},X_{i_2},\ldots,X_{i_k}\})\|P(y|\{\tilde{X}_1,\tilde{X}_2,\ldots,\tilde{X}_k\})) \quad (20)$$

Albeit easy-to-understand, equation (20) is hard to optimize. Moreover, it still remains an open problem to generate the "useless" features $\{\tilde{X}_1, \tilde{X}_2, \ldots, \tilde{X}_k\}$. In the following, equation (20) is optimized in a greedy manner and the "useless" features are generated by either randomly permutating $\{X_{i_1}, X_{i_2}, \ldots, X_{i_k}\}$ or just using additive random noise. The random permutation has been widely used in feature selection to evaluate the importance of individual features.

Algorithm 1 Feature Selection with Conditional von Neumann divergence

Input: Feature set S; Class labels y; Number of features to be selected (denote k).
Output: Selected feature set $S^\star$; Remaining feature set $\bar{S}$.
  1:   $S^\star = \{\ \}$; $\bar{S} = S$.
  2:   for i = 1 to k do
  3:     for $X_c \in \bar{S}$ do
  4:       Generate "useless" feature set (denote $\{S^\pi, X_c^\pi\}$).
  5:       Evaluate the relatedness between $T_i$ and $T_j$ with equation (1), where $T_i$ is characterized by input $\{S^\star, X_c\}$ and output y, $T_j$ is characterized by input $\{S^\pi, X_c^\pi\}$ and output y.
  6:     end for
  7:     Select the candidate feature $X_c^\star \in \bar{S}$ with the smallest relatedness between $T_i$ and $T_j$ (i.e., largest value of $R(T_i, T_j)$).
  8:   end for
  9:   $S^\star \leftarrow X_c^\star$; $\bar{S} = \bar{S}/X_c^\star$.
  10:  return $S^\star$; $\bar{S}$.

To demonstrate the computational improvements provided by embodiments of the present invention, feature selection was performed on three benchmark data sets. The first one was the breast data set which has 569 samples, and each sample is in 30 dimensional space. The second one was the ORL data set that has 400 samples in 1,024 dimensional space. The last one was the semeion data set that has 1,593 samples in 256 dimensional space. The features in semeion are binomial distributed, which is significantly different from Gaussian.

Figure 7A:
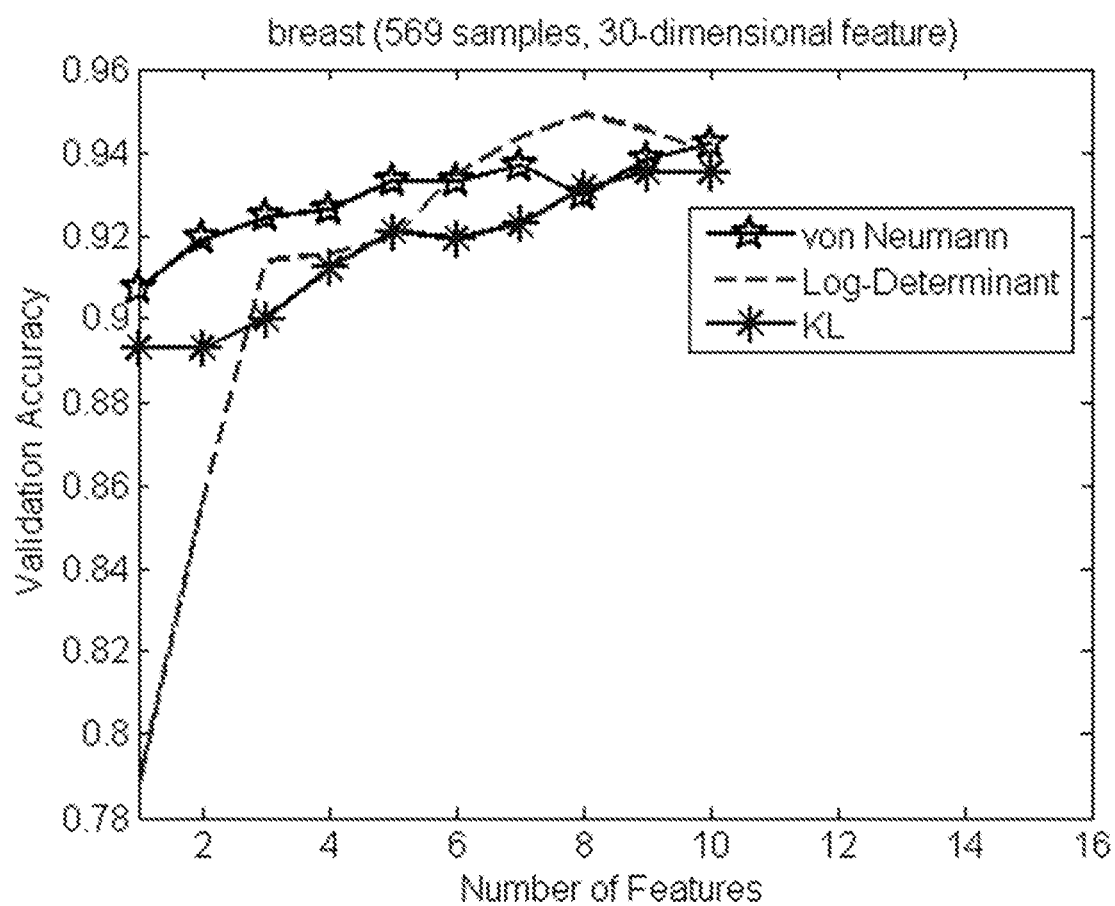
FIGS. 7A-C respectively show validation accuracy on breast, ORL and semeion data sets.
Figure 7B:
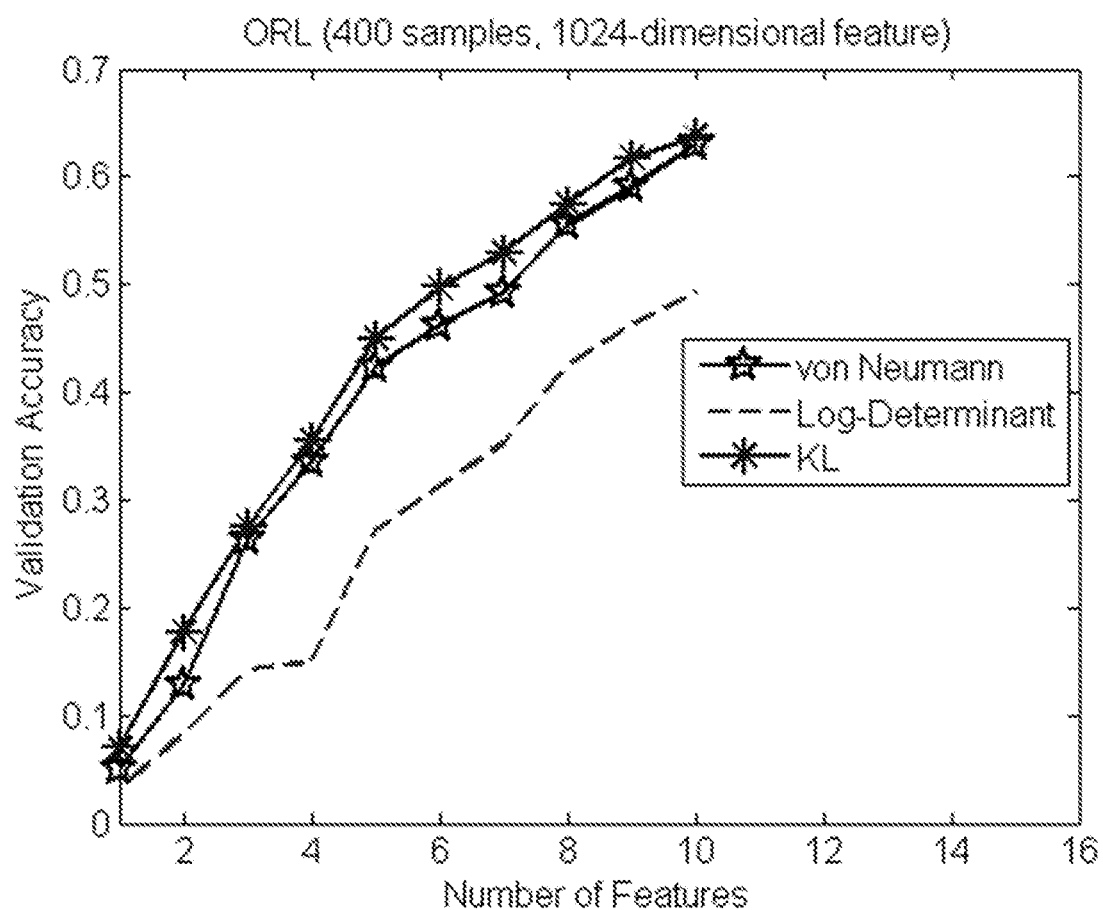
Figure 7C:
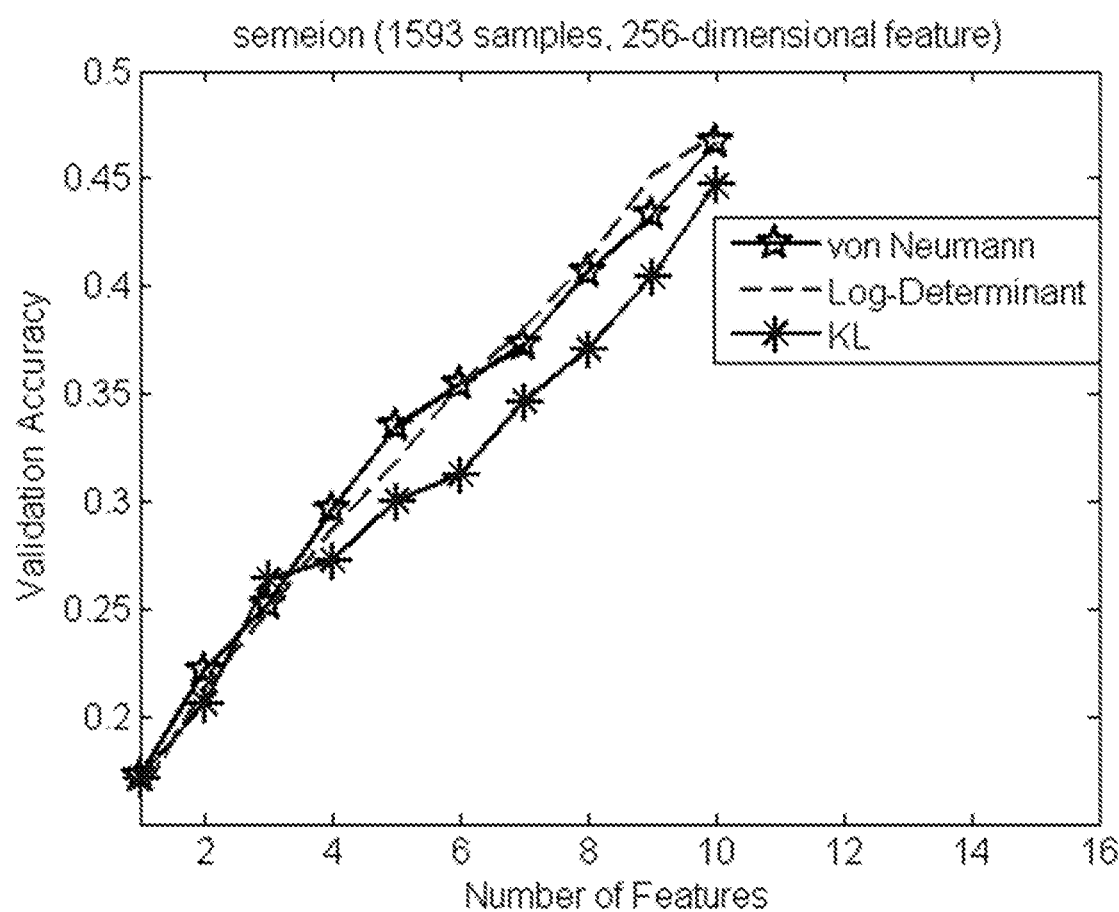

For all data sets, 10 features were selected and the linear Support Vector Machine (SVM) was used as the baseline classifier. The classification accuracies with respect to different number of features (averaged over 10 fold cross-validation) are presented in FIGS. 7A-7C. FIG. 7A shows the validation accuracy on the breast data set, FIG. 7B shows the validation accuracy on the ORL data set and FIG. 7C shows the validation accuracy on the semeion data set. As can be seen, the von Neumann divergence can always achieve desirable performance, regardless of the data distributions. For Gaussian data, the von Neumann divergence and the KL divergence perform similarly. However, the KL divergence performs poorly for non-Gaussian data.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method of measuring relatedness between prediction tasks, the method comprising:
    receiving data for a first prediction task and at least one previous prediction task;
    measuring relatedness of the first prediction task to the at least one previous prediction task, wherein the relatedness is measured as a difference between von Neumann divergence of conditional probabilities of the first prediction task and the at least one previous prediction task; and
    using a graph which connects the first prediction task and the at least one previous prediction task based on the measured relatedness to provide learned models for the prediction tasks in a multi-task learning setting.

2. The method according to claim 1, further comprising storing the learned models in a learned models database.

3. The method according to claim 2, further comprising adapting the learned models in the learned models database based on the measured relatedness between the first prediction task and the at least one previous prediction task.

4. The method according to claim 1, wherein the relatedness is in a form of a matrix based on von Neumann entropy.

5. The method according to claim 1, further comprising storing the measured relatedness in a database which includes relatedness information for other prediction tasks to the first prediction task and the at least one previous prediction task.

6. The method according to claim 1, further comprising applying the measured relatedness to determine a loss function for weighting of parameters which is used in a continual learning setting.

7. The method according to claim 1, further comprising applying the measured relatedness to detect a concept drift in a stream of the data, and adapting a model based on the detected concept drift.

8. The method according to claim 1, further comprising applying the measured relatedness for feature selection.

9. The method according to claim 1, wherein the prediction tasks are for predicting a price or consumption of electricity for which an adaptive learning algorithm is applied, and wherein the adaptive learning algorithm uses the measured relatedness to adapt learning such that predictions of the price or consumption of electricity are made in a manner which takes into account the measured relatedness.

10. The method according to claim 1, wherein the data is historical sales data and the prediction tasks are sales predictions, and wherein the measured relatedness is applied to induce the graph in the multi-task learning setting or to determine a loss function for weighting of parameters in a continual learning setting such that the sales predictions are made in a manner which takes into account the measured relatedness.

11. The method according to claim 1, wherein the prediction tasks are for predicting demand or ridership of public transportation, wherein the measured relatedness is applied to induce the graph in the multi-task learning setting or to determine a loss function for weighting of parameters in a continual learning setting such that dispatching of at least one public transportation vehicle is adjustable in a manner which takes into account the measured relatedness, and wherein each of the prediction tasks is in a form of a triple including identifiers of a public transportation vehicle, a route of the public transportation vehicle and a stop of the public transportation vehicle.

12. The method according to claim 1, wherein the relatedness is measured using the following:

$$R(T_i, T_j) = \frac{1}{2}(D(T_i \| T_j) + D(T_j \| T_i)),$$

where $T_i$ and $T_j$ are different tasks, each being characterized by a corresponding input $X \in \mathbb{R}^p$, where p is the dimensionality of input and output $Y \in \mathbb{R}^1$, and where $D(T_i \| T_j)$ is equivalent to:

$$D(T_i \| T_j) = D_{vN}(C_{X_i Y_i} \| C_{X_p y_j}) - D_{vN}(C_{X_i} \| C_{X_j}),$$

where $D_{vN}(\bullet \| \bullet)$ is relative entropy, $C_{XY} \in \mathbb{R}^{(p+1) \times (p+1)}$ is a covariance matrix evaluated in a joint space of X and Y (input and output space) and $C_X \in \mathbb{R}^{p \times p}$ denotes the covariance matrix evaluated on X.

13. A system comprising one or more processors which, alone or in combination, are configured to provide for execution of a method comprising:
    receiving data for a first prediction task and at least one previous prediction task;
    measuring relatedness of the first prediction task to the at least one previous prediction task, wherein the relatedness is measured as a difference between von Neumann divergence of conditional probabilities of the first prediction task and the at least one previous prediction task; and
    using a graph which connects the first prediction task and the at least one previous prediction task based on the measured relatedness to provide learned models for the prediction tasks in a multi-task learning setting.

14. A tangible, non-transitory computer-readable medium having instructions thereon which, upon being executed by one or more processors, alone or in combination, provide for execution of a method comprising:

receiving data for a first prediction task and at least one previous prediction task;

measuring relatedness of the first prediction task to the at least one previous prediction task, wherein the relatedness is measured as a difference between von Neumann divergence of conditional probabilities of the first prediction task and the at least one previous prediction task; and using a graph which connects the first prediction task and the at least one previous prediction task based on the measured relatedness to provide learned models for the prediction tasks in a multi-task learning setting.

15. The method according to claim 4, wherein the conditional probabilities of the first prediction task and the at least one previous prediction task are in the form of density matrices.

* * * * *